Sept. 21, 1965     B. R. EVERETT     3,207,401
STOCK FEEDING APPARATUS

Original Filed Feb. 1, 1963     4 Sheets-Sheet 2

INVENTOR.
Buford R. Everett
BY Charles H. Redman
Attorney

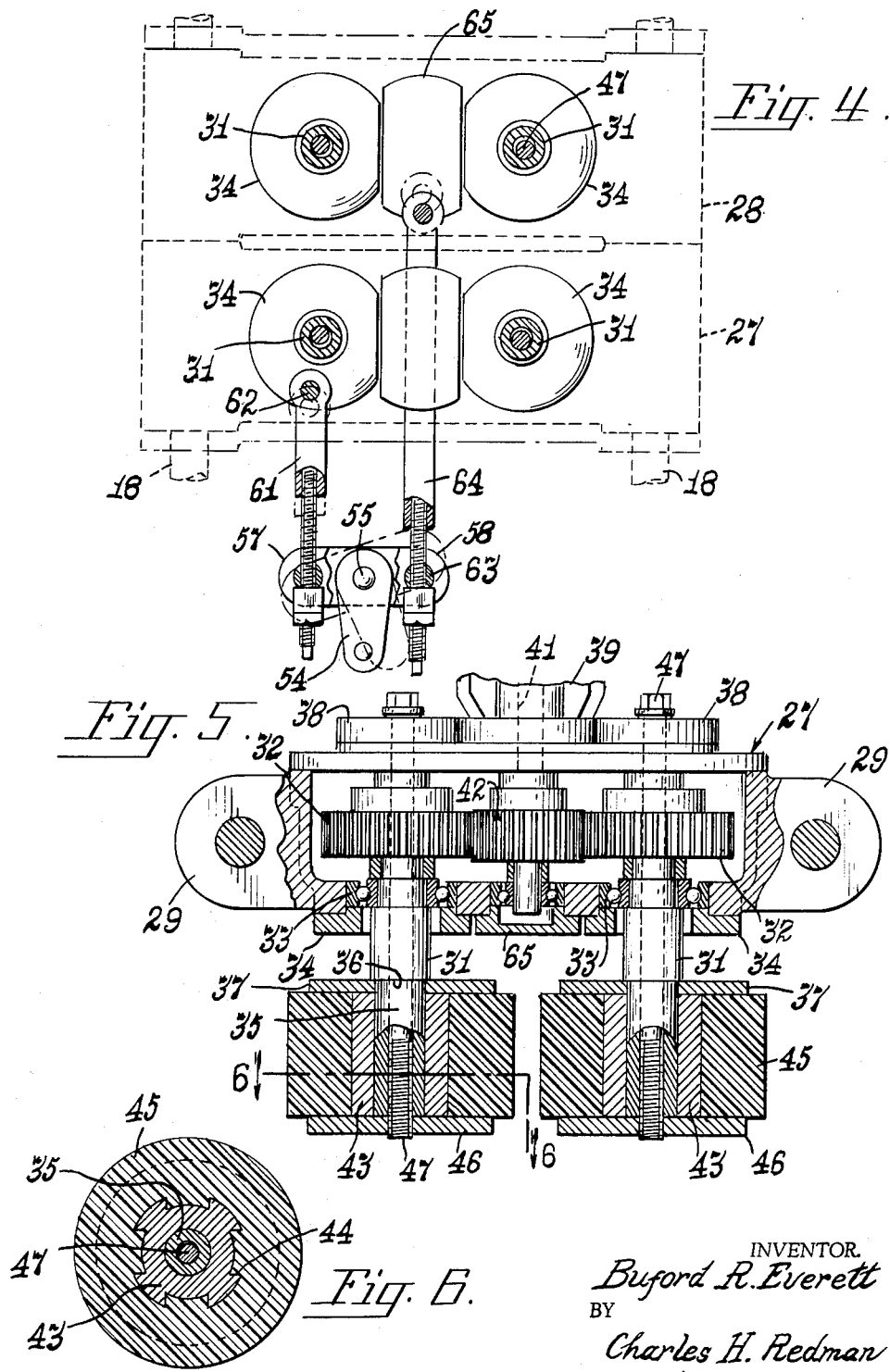

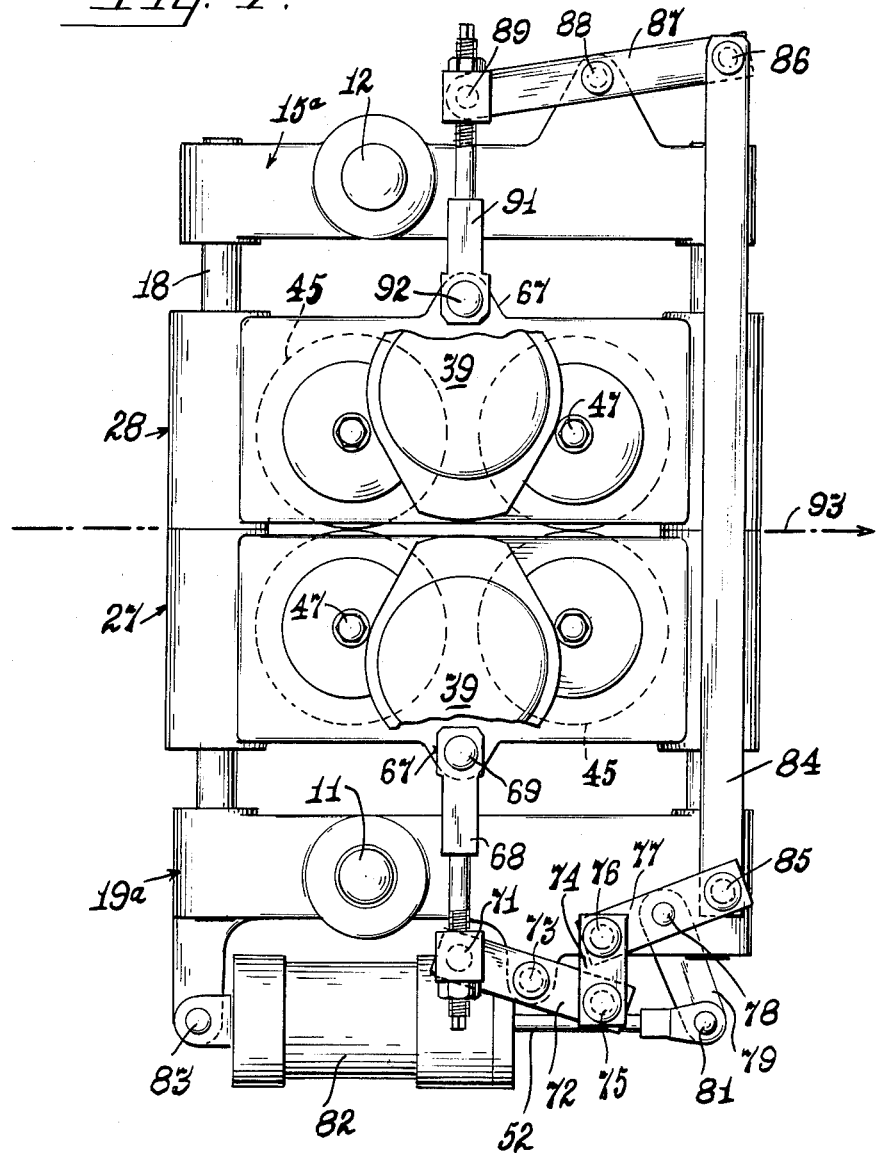

United States Patent Office 3,207,401
Patented Sept. 21, 1965

3,207,401
STOCK FEEDING APPARATUS
Buford R. Everett, Aurora, Ill., assignor to Pines Engineering Co., Inc., Aurora, Ill., a corporation of Illinois
Continuation of application Ser. No. 255,585, Feb. 1, 1963. This application Dec. 16, 1964, Ser. No. 423,890
7 Claims. (Cl. 226—177)

This is a continuation of my application, Serial No. 255,585, filed February 1, 1963, now abandoned.

The present invention relates to apparatus for feeding elongated pieces of stock, such as tubular, bar or rod stock, to apparatus that performs work thereon, such for example as shearing them into a plurality of sections of predetermined lengths. More particularly, the apparatus of the present invention is designed to feed such pieces of stock at a uniform rate of speed and to accommodate stock having a wide range of diameters.

The feeding apparatus is characterized by having two sets of power operated pressure feed rollers and novel means to simultaneously adjust the sets of rollers toward and away from each other uniform distances on each side of the length of stock so as to maintain the stock on its required axis of travel. The rollers are constructed in a novel manner so as to adapt them to accommodate pieces of stock having different diameters and for a considerable period of time before requiring redressing or tire replacement. When redressing or tire replacement becomes necessary, the tire may be easily and quickly removed.

It is, therefore, an object of the invention to provide an assembled feed apparatus of novel construction for elongated pieces of stock.

Another object is to provide an apparatus of the character described with novel means to insure that the pressure feed rollers are spaced equidistances on each side of the axis of the stock being fed thereby irrespective of the cross sectional area of said stock.

Another object is to provide a rugged apparatus of the character described which is not difficult or expensive to manufacture, is very durable in use, is easy to service, and which is entirely automatic in its operation and efficient in use.

The structure and means by which the above noted and other advantages and objects of the invention are attained will be described in the following specification, taken in conjunction with the accompanying drawings, showing preferred illustrative embodiments of the invention, in which:

FIG. 4 is a detail sectional plan view showing the control linkage, and illustrating the roller housings in dotted lines;

FIG. 5 is a transverse vertical sectional view of one of the two like roller housing assemblies, taken substantially on line 5—5 of FIG. 1;

FIG. 6 is a detail sectional view of one of the rollers, taken on line 6—6 of FIG. 5; and, FIG. 7 is a top plan view of a similar feed structure showing a modified form of linkage.

Figure 1:
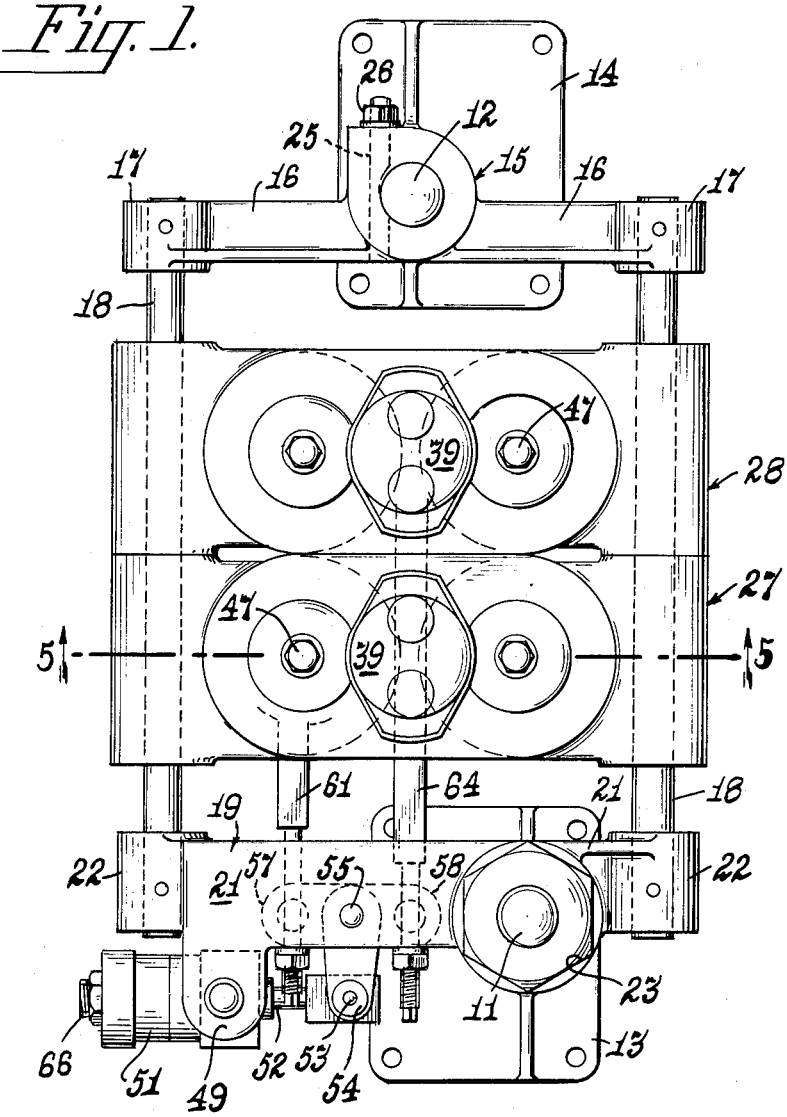
FIG. 1 is a plan view of an exemplary embodiment of the stock feeding apparatus.
Figure 2:
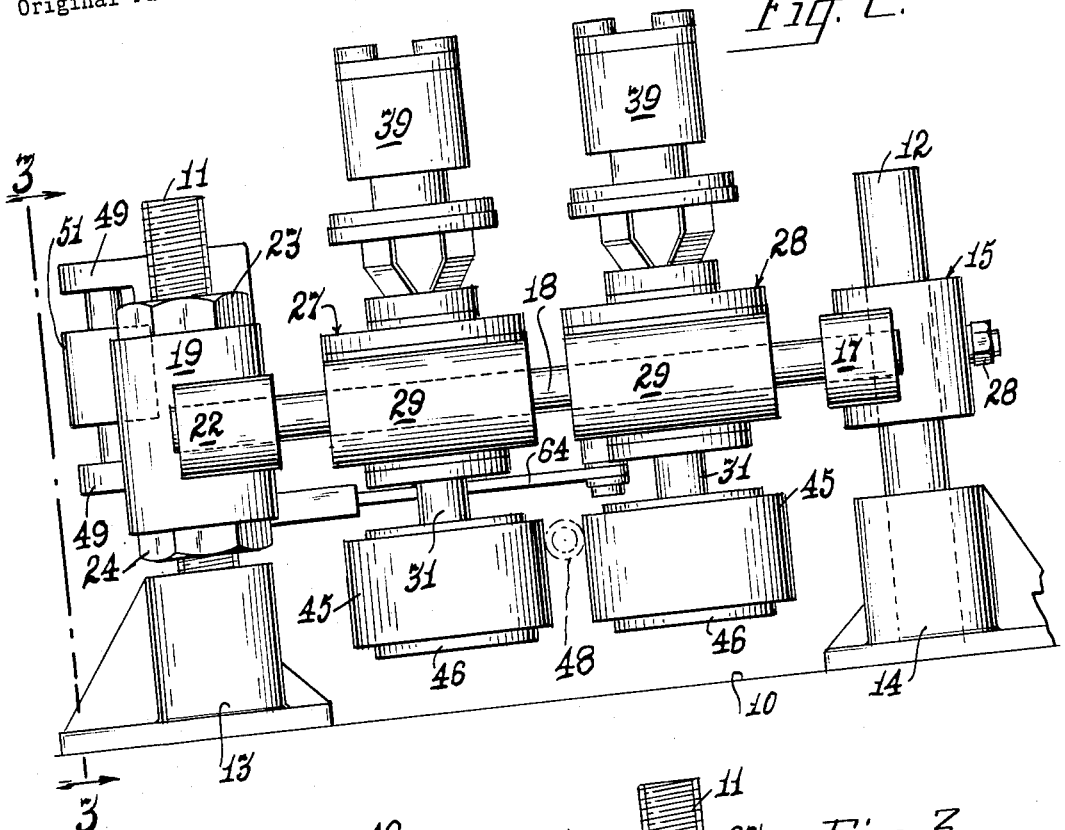
FIG. 2 is a side elevational view thereof showing the roll housings spaced apart to receive a piece of stock between their rollers.

Referring to the embodiment of the invention disclosed in an exemplary form in FIGS. 1 to 6, and particularly to FIGS. 1 and 2 thereof, the stock feeding apparatus may be supported on any suitable surface 10, by means of a pair of upstanding posts 11, 12. The post 11 is extremely threaded for a purpose to be explained presently whereas the post 12 is not threaded. These posts are anchored firmly at their bottom ends in mounting brackets 13, 14, respectively, which are secured firmly to support surface 10.

The post 12 has freely slidable thereon a bracket 15 that includes a pair of oppositely extending arms 16 each formed on its end with a horizontal tubular boss 17, in each of which one end of one of a pair of rods 18 are firmly secured. The post 11 also has a bracket 19 slidable thereon which likewise has a pair of oppositely extending arms 21, each formed on its end with a horizontal tubular boss 22, in each of which the other ends of said pair of guide rods 18 are firmly secured. The bracket 19 is adjustable on post 11 and is held in a position of vertical adjustment by means of nuts 23, 24 threaded on post 11, one above and the other below the bracket.

The bracket 15 is secured in a comparable adjusted position vertically as by means of a jam pintle 25 which may be drawn into wedging engagement with post 12 by means of a nut 26 threaded on its projecting end. The rods 18 form horizontal guides on which are mounted a pair of housings 27, 28, that are adapted to be moved toward and away from each other by means and for purposes to be described presently.

The housings 27, 28 are alike and each mounts like components, consequently the following description of one of said housing assemblies is equally applicable to the other and like numerals are used to identify corresponding parts. Referring now to the detail disclosure of one of said housing assemblies shown in FIG. 5, the housing 27 or 28 comprises an elongated, relatively narrow shallow body having an apertured boss 29 on each of its ends and which have a slide fit, one on each of the two guide rods 18. A pair of like hollow shafts 31, each mounting a pinion 32 within said housing, depend through anti-friction bearings 33 and bearing plates 34 secured to the bottom face of the housing. The projecting end of each shaft has a reduced diameter portion 35 defining a shoulder 36 to receive in abutment therewith a collar or flange 37 forming a part of a roller assembly. The upper end of each shaft is suitably journalled in a cap plate 38. A motor 39, preferably hydraulic, is mounted on the top of the housing and has its shaft 41 extending into the housing and mounting a pinion 42 that meshes with pinions 32 on the related pair of shafts 31.

As best shown in FIG. 5, each roller assembly comprises a metal hub 43 that is telescoped onto the reduced shaft diameter 35 and carried into abutment with flange 37. The outside surface of said hub is splined, as at 44 (FIG. 6) and it has freely telescoped thereover a tire 45 which is fabricated from suitable tough resiliently compressible material, such as polyurethane or other plastic, preferably having a durometer of about 80, and of such diameter that when housings 27, 28 are in their closest relationship, the rollers on one housing are in substantial peripheral contact with the rolls on the other housing. A washer or collar 46 is placed over the end of shaft 31 and a bolt 47, which extends entirely through the shaft, is threaded into said washer so that upon tightening said bolt the roller assembly is clamped firmly to the shaft for rotation therewith. When a tire requires replacement or redressing, the roller assembly can be quickly dismantled and the tire removed and the redressed tire or a new tire mounted thereon with minimum effort.

Figure 3:
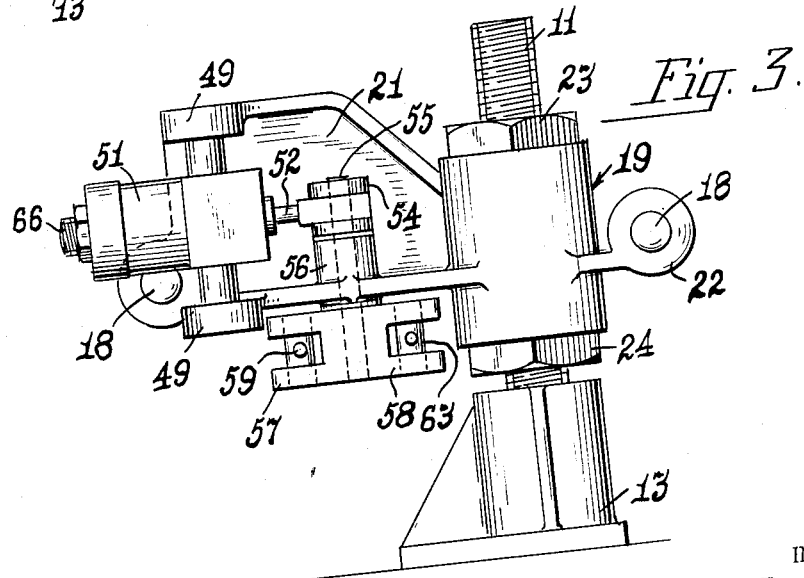
FIG. 3 is an elevational view of one end thereof as viewed along line 3—3 of FIG. 2.

As noted hereinabove, the housings 27, 28 and the pairs of rollers mounted on each are movable toward and away from each other so as to locate the pairs of rollers spaced the requisite distance apart to admit a length of tubular stock 48 (FIG. 2) between the pairs of rollers so as to be fed axially thereby when the rollers are driven. One embodiment of means for adjusting the housings is best shown in FIGS. 2, 3 and 4.

Referring to those figures, one of the arms 21 of bracket 19 includes an upstanding web formed with integral, vertically aligned bearings lugs 49 between which is pivoted an air cylinder 51 having a piston therein, the piston rod 52 of which is pivotally connected, at 53, to the end of a lever 54 carried firmly on the upper end of a stud shaft 55 journalled in boss 56 on said web. The stud shaft 55 extends downwardly through said boss and mounts firmly on its lower end a bell-crank lever having diametrically opposed arms 57, 58 of equal length. The arm 57 is pivotally connected, as at 59, to the end of a link 61, the other end of which is pivotally connected, as at 62 (FIG. 4) to one of the bearing plates 34 on the bottom of housing 27. The other arm 58 of said lever is pivotally connected, as at 63, to one end of a link 64, the other end of which is connected to the other housing 28, as for example to a cap plate 65 secured centrally thereon. As best seen in FIG. 4, the links 61, 64 are adjustable in length so as to facilitate and insure proper setting of the housings. Simultaneous movement of the housings and their sets of rollers toward and away from one another is effected through operation of air cylinder 51. The length of the effective stroke of its piston rod is controlled by adjustment of a screw 66 on the remote end of the cylinder.

In operation, the screw 66 is adjusted to locate the housings and their pairs of rollers the required distance apart to accommodate the work piece 48 which is fed between the pairs of rollers. In instances of a work piece having a diameter of say three inches, the sets of rollers are spaced a considerable distance apart and are equally spaced from the axis of said work piece. When a small diameter work piece, say one of about one-half inch, is to be fed between the sets of rollers, the housings are moved toward one another by means of the air cylinder 51 and its piston.

In the instance of feeding small diameter work pieces it is preferable initially to adjust the housings vertically downward so that the small diameter work piece is fed between, for example, the upper region of the rollers. When the tires on the rollers wear or compress under constant load to a degree to render them excessively concave in the areas engaged by the work piece, the housings 27, 28 can be adjusted in an upward direction to present an unused surface of the tires to the work piece. Because of the wide tread on the rollers this vertical adjustment may be effected several times before retreading or redressing is required.

In the exemplary embodiment illustrated in FIG. 7, the adjusting linkage is arranged to work on opposite sides of the housings 27, 28, centrally of their lengths and like numerals are used to identify parts corresponding to parts of the apparatus previously described. As shown, the housings 27, 28 are slidably mounted on guide rods 18 for adjustment toward and away from each other. In this instance each housing is provided with a centrally located lug 67 on one edge thereof. A link 68 is connected, as by pin 69, to one of the lugs 67, which link is connected at its other end, as at 71, to one arm of a bell-crank lever 72 pivoted at 73 on the vertically adjustable bracket 19a. The other arm of said lever 72 pivotally mounts a link 74, as at 75, that is connected, as at 76, to one end of a second bell-crank lever 77 mounted firmly on a vertical shaft 78 carried on bracket 19a. The shaft 78 mounts firmly an arm 79 that is connected, as at 81, to the piston rod 52 of an air cylinder 82 mounted pivotally at 83 on the said bracket 19a. One end of a link 84 is connected pivotally, as at 85, to the other arm of bell-crank 77. This link bridges the housings 27, 28 and is connected at its other end, as at 86, to one arm of a lever 87 pivoted at 88 on the vertically adjustable bracket 15a. The other arm of said lever 87 is pivotally connected, as at 89, to one end of a link 91 connected, as at 92, to the lug 67 on housing 28. Both links 68 and 91 are adjustable in length so as to afford accurate setting of the linkage for insuring that when the cylinder 82 is actuated both housings, and of course the pairs of roller assemblies carried thereby, are adjusted like distances on each side of the axis 93 of the work piece fed therethrough.

As many possible embodiments may be made in the invention, and as many changes might be made in the embodiments above set forth, it is to be understood that all matters hereinbefore set forth or shown in the accompanying drawings are to be interpreted as illustrative and not in a limiting sense.

What I claim and desire to secure by Letters Patent of the United States is:

1. A stock feeding apparatus comprising, in combination, spaced, horizontally disposed and parallel guide rods, a pair of like housings extending between and supported for movement on said guide rods, at least one roller shaft journalled for rotation in and depending from each of said housings, a stock-engaging roller on each said shaft, shaft driving means individual to each said housing for driving the shaft depending therefrom and its roller, and means for actuating said housings and thereby the stock-engaging rollers towards and away from one another in unison including a power source mounted adjacent said housings, a pair of axially movable links each extending to and connected at one end to an external point on a housing, and connections between said power source and the other ends of said links for actuating said links axially in unison but in opposite directions.

2. A stock feeding apparatus according to claim 1, including means for adjusting the length of said links thereby to effect proper horizontal positioning of the housings and thereby of the stock-engaging rollers with respect to the stock to be fed.

3. A stock feeding apparatus according to claim 2, and wherein said guide rods are carried by spaced pairs of arms and said pairs of arms are slidably supported on vertical posts, and wherein means are provided for adjusting said pairs of arms vertically on said posts thereby to effect vertical adjustment of the stock-engaging rollers.

4. A stock feeding apparatus according to claim 1, and wherein said guide rods are carried by spaced pairs of arms and said pairs of arms are slidably supported on vertical posts, and wherein means are provided for adjusting said pairs of arms vertically on said posts thereby to effect vertical adjustment of the stock-engaging rollers.

5. Apparatus for feeding elongated pieces of stock in the direction of their length into a position to have work performed thereon, said apparatus comprising a support frame including horizontal and parallel guide rods, a pair of housings arranged side by side on said guide rods, said housings being movable toward and away from each other, a pair of stock-engaging rollers on each housing, means individual to each pair of rollers to drive said rollers, a reciprocable motor, a rock-arm operably connected to said motor, a pair of axially movable links connected to said rock-arm and one to each housing, said motor being operable to rotate the rock-arm and move the links axially in unison in opposite directions for carrying the housings and their rollers toward and away from each other like distances to accommodate stock of different diameters.

6. An apparatus according to claim 5 in which the effective length of the links is adjustable.

7. A stock feeding apparatus comprising, in combination, a pair of spaced apart upstanding posts, an arm vertically adjustable on each post, a pair of horizontal guide rods firmly connected to and bridging said arms, a pair of housings arranged side by side and guided on said guide rods, two pairs of shafts with one pair journalled in and extending outwardly and downwardly from each housing, separate drive means for each of said pairs of shafts, stock engaging rollers one on the outwardly extending end of each shaft, and means for adjusting said guide-rods vertically to raise and lower the rollers.

References Cited by the Examiner

UNITED STATES PATENTS

| | | | |
|---|---|---|---|
| 2,871,011 | 1/59 | Hercik | 226—179 |
| 2,957,574 | 10/60 | Compton | 226—111 |
| 3,014,628 | 12/61 | Littlehale | 226—177 |
| 3,052,393 | 9/62 | McKenzie | 226—177 |

FOREIGN PATENTS 473,996  3/29  Germany.

ROBERT B. REEVES, *Primary Examiner.*